US008283280B2

(12) United States Patent
Oudart

(10) Patent No.: US 8,283,280 B2
(45) Date of Patent: Oct. 9, 2012

(54) REFORMING CATALYST PREPARATION BY DRY IMPREGNATION

(75) Inventor: Yohan Oudart, Pantin (FR)

(73) Assignee: IFP Energies nouvelles, Rueil Malmaison Cedex (FR)

( * ) Notice: Subject to any disclaimer, the term of this patent is extended or adjusted under 35 U.S.C. 154(b) by 178 days.

(21) Appl. No.: 12/774,480

(22) Filed: May 5, 2010

(65) Prior Publication Data

US 2010/0285953 A1 Nov. 11, 2010

(30) Foreign Application Priority Data

May 7, 2009 (FR) ..................................... 09 02260

(51) Int. Cl.
*B01J 27/135* (2006.01)
*B01J 27/06* (2006.01)
*B01J 27/128* (2006.01)
*B01J 23/32* (2006.01)
*B01J 23/00* (2006.01)
*B01J 23/60* (2006.01)

(52) U.S. Cl. ........ 502/227; 502/224; 502/229; 502/324; 502/325; 502/329

(58) Field of Classification Search .................. 502/224, 502/227, 229, 324, 325, 349
See application file for complete search history.

(56) References Cited

U.S. PATENT DOCUMENTS 2,927,088 A 3/1960 Michalko et al.
3,830,727 A * 8/1974 Kluksdahl et al. ............ 208/139
3,992,468 A * 11/1976 Cosyns et al. ................ 585/489
5,482,910 A 1/1996 Bricker et al.
5,561,096 A * 10/1996 Schoebrechts et al. ....... 502/330
5,922,639 A * 7/1999 Alario et al. .................. 502/230
6,331,574 B1 * 12/2001 Lapidus et al. ............... 518/709
6,872,300 B1 3/2005 Galperin et al.

OTHER PUBLICATIONS

Search Report of FR 0902260 (Dec. 15, 2009).

* cited by examiner

*Primary Examiner* — Patricia L Hailey
(74) *Attorney, Agent, or Firm* — Millen, White, Zelano & Branigan, P.C.

(57) ABSTRACT

The invention relates to a method of preparing a reforming catalyst comprising a group VIII metal, a halogen, at least one metal selected from the group made up of the group VIIB metals and group IVA metals, a refractory oxide support. The method comprises stages of preparing a dry impregnation aqueous solution containing ammonia, either in solution or in gas form and a complexing agent, of aging the aqueous solution, of dry impregnation of the support, of maturing the impregnated support, of drying and of calcination.

16 Claims, No Drawings

REFORMING CATALYST PREPARATION BY DRY IMPREGNATION

CROSS-REFERENCE TO RELATED APPLICATION

This application is related to concurrently filed application "Dehydrogenation Catalyst Preparation by Dry Impregnation" by Alexandre Chambard, Ser. No. 12/775,822, claiming priority of FR 09/02.261 filed May 7, 2009, incorporated by reference herein.

FIELD OF THE INVENTION

Reforming catalysts are multimetallic catalysts. There are two main categories of reforming catalysts having different properties: platinum-tin catalysts, of high selectivity and low stability, and platinum-rhenium catalysts, of medium selectivity and high stability. The present invention relates to a simplified method of preparing the two types of catalyst. Generally, these catalysts are prepared by sequential impregnation of each element in excess. These stages are long and labour intensive, but they allow to obtain high-performance catalysts. The simplified method of preparing catalysts according to the invention allows, among other things, to reduce the catalyst manufacturing costs while keeping, or even enhancing, the catalytic performances.

Reforming catalysts are bifunctional, i.e. they consist of two phases, a metallic phase and an acid phase, fulfilling a well-determined role in the catalyst activity. The metallic function provides dehydrogenation of the naphthenes and of the paraffins, and hydrogenation of the coke precursors. The acid function provides isomerization of the naphthenes and of the paraffins, and cyclization of the paraffins. The acid function is supplied by the support itself, most often a halogenated alumina. The metallic function is generally provided by a noble metal from the platinum family and at least one promoter metal, mainly tin for the continuous process or rhenium in the semi-regenerative process. The metallic and acid phases can be promoted by various dopants.

High-performance catalysts have to meet many criteria. The balance between the acidity of the support and the metallic function has to be well adjusted. This requires a metallic distribution in the support as homogeneous as possible. The metals must enter the core of the support and concentration fluctuations have to be as low as possible. Generally, this is provided for platinum by an adsorption competitor, which can be one or more acids in low concentration, such as hydrochloric, nitric, carbonic, sulfuric, citric, formic, oxalic acid. This competition can take place when the impregnation volume is introduced in excess in relation to the pore volume of the support. During dry impregnation, this competition cannot occur. Another way of introducing the platinum to the core of the support therefore has to be used. The object of the invention describes a new dry impregnation method for metals allowing good distribution thereof to the core of the support.

BACKGROUND OF THE INVENTION

U.S. Pat. No. 5,482,910 describes a catalyst preparation method that involves using a chelating ligand such as EDTA. An aqueous solution comprising the chelating ligand and a salt of an alkaline or alkaline-earth metal is first prepared at a temperature ranging from about 80° C. to the boiling point temperature thereof. This solution is then mixed with a solution comprising a group VIII metal. This solution is aged at a temperature ranging between about 40° C. and 100° C., then it is used for impregnating the support. The impregnated support is thereafter dried, calcined, optionally oxychlorinated and finally reduced.

U.S. Pat. No. 3,259,589 describes a catalyst preparation method comprising preferably platinum preferably deposited on an alumina. The platinum can be introduced in complexed form by an organic acid of HOOC[CRR']n COOH type, with R=OH, H or an alkyl function and R'=H, an alkyl function or COOH.

U.S. Pat. No. 2,889,287 describes a hydrocracking catalyst preparation method comprising at least one active metal selected from the group consisting of groups VI and VIII metals of the periodic table and the oxides of said metals, a support selected from the group consisting of alumina and silica-alumina. The active metal(s) is (are) deposited on the support by impregnation of the support with a complex of the metal(s), then the impregnated support is dried and calcined.

SUMMARY OF THE INVENTION

The invention relates to a method of preparing a reforming catalyst comprising a group VIII metal, a halogen, at least one metal selected from the group made up of the group VIIB metals and group IVA metals, a refractory oxide support. The method comprises stages of preparing a dry impregnation aqueous solution containing ammonia, either in solution or in gas form and a complexing agent, of aging the aqueous solution, of dry impregnation of the support, of maturing the impregnated support, of drying and of calcination.

DETAILED DESCRIPTION

The invention relates to a method of preparing a reforming catalyst comprising a group VIII metal, preferably platinum, a halogen, at least one metal selected from the group made up of group VIIB metals, preferably rhenium, and group IVA metals, preferably tin, a refractory oxide support, said method comprising the following stages:

- a stage a) of preparing the dry impregnation aqueous solution, comprising either a group VIII metal or a group VIII metal and a group VIIB metal, ammonia either in solution, preferably in aqueous solution, or in gas form, and at least one complexing agent selected from the group made up of EDTA and derivatives thereof, at least bidentate primary amine complexes, secondary amine complexes, pyridine ring derivatives, preferably selected from the group made up of DTPA and derivatives thereof, ethylene diamine, cycles and 2,2'-bipyridine,
- a stage b) of aging said dry impregnation aqueous solution obtained at the end of stage a), over a period of time ranging between 5 minutes and 24 hours, preferably between 5 minutes and 12 hours, at a temperature ranging between 15° C. and 100° C.,
- a stage c) of dry impregnation of the support by the aged dry impregnation aqueous solution obtained at the end of stage b),
- a stage d) of maturing the impregnated support obtained at the end of stage c), said maturation being carried out in a humid medium over a period of time ranging between 30 minutes and 48 hours, preferably between 1 hour and 36 hours,
- a stage e) of drying the impregnated support obtained at the end of stage d), the drying temperature ranging between 80° C. and 200° C., preferably between 100° C. and 150° C., over a period of time ranging between 5 minutes and 5 days, a calcination stage f), the calcination temperature ranging between 300° C. and 850° C. and the calcination time ranging between 5 minutes and 20 hours, preferably between 20 minutes and 16 hours.

The complexing agent of stage a) can be EDTA (ethylene diamine tetra-acetic acid) or a derivative thereof. These are aminocarboxylate polydentate compounds which are, for example, nitriloacetic acids such as NTA (nitrilotriacetic acid), DTPA (diethylene triamine penta-acetic acid), DCTA (cyclohexane diamine tetra-acetic acid), EDTPO (ethylene diamine-N,N,N',N'-tetrakis(methylene phosphonic)acid).

The complexing agent of stage a) can also be ethylene diamine or a derivative thereof, of R1R2N—R3-NR4R5 type, where R1, R2, R4 and R5 can be hydrogen, a carbon chain, substituted or not, inorganic groups, and R3 a carbon chain, substituted or not.

The complexing agent of stage a) can also be a crown ether: heterocycles of $\{$—R1-O—R3-O$\}_{x/2}$ type where x is an integer ranging from 1 to 20, and R1 and R3 a carbon chain, substituted or not.

The complexing agent of stage a) can also be cyclen (1,4,7,10-tetraazacyclododecane) or a compound of the family of nitrogen-containing macrocycles analogous to the crown ethers of $\{$—R1-NR2-R3-NR4-$\}_{x/2}$ type where x is an integer ranging from 1 to 20, and R2 and R4 can be hydrogen, a carbon chain, substituted or not, inorganic groups, and R1 and R3 a carbon chain, substituted or not.

The complexing agent of stage a) can also be a derivative of pyridine-ring compounds such as, for example, 2,2'-bipyridine, 2,2'-bipyridyldicarboxylic acid, 4,4'-bipyridine, terpyridine, as well as phenanthroline and derivatives thereof.

The complexing agent of stage a) can also be a salen, i.e. a complexing agent containing N-salicylidene functions such as, for example, N,N'-bis(salicylidene)ethylene diamine, N,N'-bis(salicylidene)propane diamine.

For stage c), the support of pore volume Vp is generally contacted with a volume V of the aged dry impregnation aqueous solution obtained at the end of stage b), while having 0.85 Vp<V<1.15 Vp. The pore volume is defined as the volume of the pores whose size is above 0.0036 μm. It can for example be measured by mercury porosimetry.

For stage d), maturation in a humid medium corresponds to a maturation stage in a medium whose relative humidity is above 80%. Relative humidity is defined as the ratio of the partial pressure of the steam contained in the air to the saturated vapour pressure at the same temperature and pressure.

According to a variant, the method comprises, after stage f), an oxychlorination stage g), for example in an air stream containing the desired proportion of chlorine and optionally containing water, the oxychlorination temperature ranging between 300° C. and 850° C., and the oxychlorination time ranging between 5 minutes and 20 hours, preferably between 20 minutes and 16 hours. During the oxychlorination stage, the chlorine is usually injected in form of $Cl_2$, of hydrochloric acid (HCl) or in form of an organochlorinated compound. It is generally injected in gas form at a temperature ranging between 250° C. and 350° C. This injection is generally performed so as to obtain between 0.5 and 2 wt. % chlorine on the final catalyst.

According to a variant, the catalyst preparation method comprises, after stage f) or g), a stage h) of catalyst reduction under hydrogen at a temperature ranging between 300° C. and 850° C. over a period of time ranging between 5 minutes and 20 hours, preferably between 20 minutes and 16 hours. In the case of catalysts containing a group VIII metal and rhenium, a sulfurization stage can be added. It consists in introducing sulfur during a thermal treatment at a temperature ranging between 300° C. and 850° C. over a period of time ranging between 5 minutes and 20 hours, preferably between 20 minutes and 16 hours, by injecting a sulfur compound such as, for example, $H_2S$ or an organic compound.

In the case of catalysts comprising a group IVA metal, the latter can be introduced by means of any method known to the person skilled in the art such as, for example, by excess impregnation, dry impregnation or upon preparation of the support. Within the scope of this invention, it is particularly interesting to introduce it during support preparation.

The group VIII metal can be introduced in form of metallic salt, hydroxide, oxide, halogenated and/or hydrated. Preferably, this metal is platinum. In cases where the noble metal is platinum, the platinum precursors belong to the following group, without this list being limitative: hexachloroplatinic acid, bromoplatinic acid, ammonium chloroplatinate, platinum chlorides, platinum dichlorocarbonyl dichloride, tetraamine platinum chloride. Organic platinum complexes such as platinum diacetylacetonate (II) can also be used. Preferably, the precursor used is hexachloroplatinic acid.

In cases where rhenium is used, precursors such as perrhenic acid and ammonium or potassium perrhenate can be used, without this list being limitative.

When the various precursors used in the preparation of the catalyst according to the invention contain no halogen or contain halogen in insufficient amount, it may be necessary to add a halogenated compound during the preparation. Any compound known to the person skilled in the art can be used and incorporated at any catalyst preparation stage according to the invention. In particular, it is possible to use organic compounds such as methyl or ethyl halogenides, for example dichloromethane, chloroform, dichloroethane, methylchloroform or carbon tetrachloride.

According to a variant, the halogen can also be added by means of impregnation by a solution containing a halogenated agent, at any time of the preparation, notably with the dry impregnation aqueous solution containing the platinum. The halogenated compound is preferably chlorine. The solution is preferably aqueous and the halogenated compound therefore has to be soluble therein in sufficient proportions. A typical protocol consists in impregnating the solid so as to introduce the desired amount of halogen. The catalyst is maintained in contact with the aqueous solution over a sufficiently long period of time to deposit this amount of halogen. The halogenated precursors can be inorganic compounds such as, for example, hydrochloric, bromic and hydrofluoric acids, aluminium chlorate, aluminium chlorides, hydrated or not, ammonium halogenides or any other halogenated salt. Organochlorinated compounds are also interesting, for example chloral hydrate, chlorobutanol, chloric acid, chloroacetic and trichloroacetic acids, chlorhydrin, dichloroethane, 2,2,2-trichloroethanol, 2-chloroethylphosphonic acid, 1,1,1-trichloropropanal, trichloroisocyanuric acid, trichlorosalicylic acid, sucralose. The most interesting organochlorinated compounds seem to be those having high boiling point temperatures and containing a high proportion of chlorine.

Chlorine can also be added to the catalyst according to the invention by means of an oxychlorination treatment. Such a treatment can for example be carried out between 350° C. and 550° C. for several hours in an air stream containing the desired amount of chlorine and optionally water.

Prior to using it, the catalyst is subjected to a treatment under hydrogen in order to obtain an active metallic phase. The procedure of this treatment consists for example of a slow temperature rise in a hydrogen stream until the maximum reduction temperature ranging for example between 100° C. and 600° C., preferably between 200° C. and 580° C., is reached, followed by maintaining this temperature for example during 30 minutes to 6 hours. This reduction can be carried out immediately after calcination or later by the user. The dried product can also be directly reduced by the user.

The catalysts prepared according to the invention generally have a homogenous platinum, rhenium and chlorine distribution. Platinum generally has a distribution coefficient ranging between 0.80 and less than 1.2, preferably between 0.9 and 1.1.

Definition of Coefficient R

The distribution profiles of the elements within the catalyst grains are obtained by means of an EPMA. It is thus possible to obtain the distribution profile c(x) for $x \in [-r;+r]$ with c the local concentration of the element, r the radius of the ball or of the extrudate and x the position of the analysis point along the diameter of the grain with respect to the centre of this grain.

The distribution of the elements is characterized by a dimensionless coefficient R weighting the local concentration by an increasing weight as a function of the position on the diameter. By definition:

$$R = \int_{-r}^{r} c(x)x^2 dx \Big/ \frac{r^2}{3} \int_{-r}^{r} c(x)\, dx$$

Thus, an element whose concentration is uniform has a coefficient R equal to 1, an element deposited in a dome (concentration at the core higher than the concentration at the edges of the support) has a coefficient above 1 and an element distributed in a crust (concentration at the edges higher than the concentration at the core of the support) has a coefficient below 1. Analysis using an EPMA gives the concentration values in a finite number of values of x, R is thus evaluated numerically by integration methods known to the person skilled in the art. Preferably, R is determined by means of the trapezoidal method.

According to a variant, the support generally also comprises at least one doping metal selected from the group made up of scandium, yttrium, germanium, indium, antimony, lead, thallium, gallium, bismuth, phosphorus, arsenic, lanthanides and actinides.

In the case of the dopant, precursors of nitrate, halogenide or organometallic type can be used, without this list being limitative.

The final proportion of group VIII metal in the catalyst generally ranges between 0.01 and 5 wt. %, preferably between 0.01 and 2 wt. %.

In cases where the group VIIB metal is present in the catalyst, its final proportion in the catalyst generally ranges between 0.01 and 5 wt. %, preferably between 0.01 and 3 wt. %.

In cases where the group IVA metal is present in the catalyst, its final proportion in the catalyst generally ranges between 0.01 and 7 wt. %, preferably between 0.01 and 3 wt. %.

The halogen is generally selected from the group made up of fluorine, chlorine, bromine and iodine, preferably the halogen is chlorine. The final proportion of halogen in the catalyst generally ranges between 0.1 and 10 wt. %. The final proportion of chlorine in the catalyst generally ranges between 0.5 and 2 wt. %.

Generally, the support of the catalysts used is a refractory oxide selected from among magnesium, titanium, zirconium, alumina, silicon oxides or mixtures thereof. Silica, alumina or silica-alumina, and more preferably alumina are used. The support generally comes in form of balls or extrudates depending on the method. It is generally prepared from a boehmite gel. When this gel is calcined at a certain temperature, it turns into gamma alumina. Boehmite can have various compositions. It mainly comprises aluminium and also impurities in variable proportions.

Besides, the specific surface area of the support generally ranges between 50 and 600 $m^2/g$, preferably between 150 and 400 $m^2/g$.

The invention also relates to a reforming method by contacting a catalyst prepared according to the invention on a feed, said feed comprising paraffinic, naphthenic and aromatic hydrocarbons containing 5 to 12 carbon atoms per molecule, said feed being contacted with the catalyst at a temperature ranging between 400° C. and 700° C., the mass flow rate of feed treated per catalyst mass unit ranging between 0.1 and 10 kg/(kg·h), the operating pressure ranging between 0.1 and 4 MPa.

EXAMPLES

Example 1 (not in Accordance)

Preparation of Catalyst A

The support is a γ alumina of specific surface area 215 $m^2$ per gram containing 0.3 wt. % tin.

100 g support are contacted with 500 $cm^3$ of an aqueous solution of hydrochloric acid and of hexachloroplatinic acid comprising 0.30 g platinum. The amount of hydrochloric acid is adjusted so as to have a chlorine content close to 1 wt. % in the final catalyst. The impregnation solution is then withdrawn.

The catalyst thus obtained is dried for 1 hour at 120° C., calcined for 2 hours at 500° C. and reduced under hydrogen for 2 hours at 520° C.

The final catalyst contains 0.29 wt. % platinum and 0.3 wt. % tin. The platinum has an average distribution coefficient of 0.99.

Example 2 (not in Accordance)

Preparation of Catalyst B

The support is a γ alumina of specific surface area 215 $m^2$ per gram containing 0.3 wt. % tin. 100 g support are contacted with 65 $cm^3$ of an aqueous solution of hydrochloric acid and of hexachloroplatinic acid comprising 0.30 g platinum. The amount of hydrochloric acid is adjusted so as to have a chlorine content close to 1 wt. % in the final catalyst.

The catalyst thus obtained is aged for 24 hours in a humid atmosphere (relative humidity 99%), then dried for 1 hour at 120° C., calcined for 2 hours at 500° C. and reduced under hydrogen for 2 hours at 520° C.

The final catalyst contains 0.29 wt. % platinum and 0.3 wt. % tin. The platinum has an average distribution coefficient of 0.61.

Example 3 (not in Accordance)

Preparation of Catalyst C

The support is a γ alumina of specific surface area 215 $m^2$ per gram containing 0.3 wt. % tin. 100 g support are contacted with 65 $cm^3$ of an aqueous solution of hexachloroplatinic acid comprising 0.30 g platinum. The catalyst thus obtained is aged for 24 hours in a humid atmosphere (relative humidity 99%), then dried for 1 hour at 120° C., calcined for 2 hours at 500° C., then again 2 hours during which chlorine is injected in order to obtain 1 wt. % chlorine in the final catalyst. The support is then reduced under hydrogen for 2 hours at 520° C.

The final catalyst contains 0.29 wt. % platinum and 0.3 wt. % tin. The platinum has an average distribution coefficient of 0.65.

Example 4 (not in Accordance)

Preparation of Catalyst D

The support is a γ alumina of specific surface area 215 $m^2$ per gram containing 0.3 wt. % tin. 100 g support are contacted with 65 $cm^3$ of an aqueous solution of hexachloroplatinic acid comprising 0.30 g platinum and 2 molar equivalents of citric acid with respect to the platinum. This solution has first been aged for 3 hours in the presence of ammonia. The catalyst thus obtained is aged for 24 hours in a humid atmosphere (relative humidity 99%), then dried for 1 hour at 120° C., calcined for 2 hours at 500° C., then again 2 hours during which chlorine is injected in order to obtain 1 wt. % chlorine in the final catalyst. The support is then reduced under hydrogen for 2 hours at 520° C.

The final catalyst contains 0.29 wt. % platinum and 0.3 wt. % tin. The platinum has an average distribution coefficient of 0.78.

Example 5 (not in Accordance)

Preparation of Catalyst E

The support is a γ alumina of specific surface area 215 $m^2$ per gram containing 0.3 wt. % tin. 100 g support are contacted with 65 $cm^3$ of an aqueous solution of hexachloroplatinic acid comprising 0.30 g platinum. This solution has been aged for 3 hours in the presence of ammonia. The catalyst thus obtained is aged for 24 hours in a humid atmosphere (relative humidity 99%), then dried for 1 hour at 120° C., calcined for 2 hours at 500° C., then again 2 hours during which chlorine is injected in order to obtain 1 wt. % chlorine in the final catalyst. The support is then reduced under hydrogen for 2 hours at 520° C.

The final catalyst contains 0.29 wt. % platinum and 0.3 wt. % tin. The platinum has an average distribution coefficient of 0.88.

Example 6 (not in Accordance)

Preparation of Catalyst F

The support is a γ alumina of specific surface area 215 $m^2$ per gram containing 0.3 wt. % tin. 100 g support are contacted with 65 $cm^3$ of an aqueous solution of hexachloroplatinic acid comprising 0.30 g platinum and 3 molar equivalents of ethylene diamine with respect to the platinum. This solution has first been aged for 3 hours in the presence of ammonia. The catalyst thus obtained is aged for 24 hours in a humid atmosphere (relative humidity 99%), then dried for 1 hour at 120° C., calcined for 2 hours at 500° C., then again 2 hours during which chlorine is injected in order to obtain 1 wt. % chlorine in the final catalyst. The support is then reduced under hydrogen for 2 hours at 520° C.

The final catalyst contains 0.29 wt. % platinum and 0.3 wt. % tin. The platinum has an average distribution coefficient of 0.97.

Example 7 (not in Accordance)

Preparation of Catalyst G

The support is a γ alumina of specific surface area 215 $m^2$ per gram containing 0.3 wt. % tin. 100 g support are contacted with 65 $cm^3$ of an aqueous solution of hexachloroplatinic acid comprising 030 g platinum and 3 molar equivalents of ethylene diamine with respect to the platinum. This solution has first been aged for 3 hours in the presence of ammonia. The catalyst thus obtained is not aged in a humid atmosphere but it is dried for 1 hour at 120° C., calcined for 2 hours at 500° C., then again 2 hours during which chlorine is injected in order to obtain 1 wt. % chlorine in the final catalyst. The support is then reduced under hydrogen for 2 hours at 520° C.

The final catalyst contains 0.29 wt. % platinum and 0.3 wt. % tin. The platinum has an average distribution coefficient of 0.87.

Example 8 (not in Accordance)

Preparation of Catalyst H

The support is a γ alumina of specific surface area 215 $m^2$ per gram containing 0.3 wt. % tin. 100 g support are contacted with 65 $cm^3$ of an aqueous solution of hexachloroplatinic acid comprising 0.30 g platinum and 3 molar equivalents of ethylene diamine with respect to the platinum. This solution has not first been aged for 3 hours in the presence of ammonia. The solution comes in form of a suspension. The catalyst thus obtained is aged for 24 hours in a humid atmosphere (relative humidity 99%), then dried for 1 hour at 120° C., calcined for 2 hours at 500° C., then again 2 hours during which chlorine is injected in order to obtain 1 wt. % chlorine in the final catalyst. The support is then reduced under hydrogen for 2 hours at 520° C.

The final catalyst contains 0.29 wt. % platinum and 0.3 wt. % tin. The platinum has an average distribution coefficient of 0.68.

Example 9 (in Accordance)

Preparation of Catalyst I

The support is a γ alumina of specific surface area 215 $m^2$ per gram containing 0.3 wt. % tin. 100 g support are contacted with 65 $cm^3$ of an aqueous solution of hexachloroplatinic acid comprising 0.30 g platinum and 1 molar equivalent of diethylene triamine penta-acetic acid (DTPA) with respect to the platinum. This solution has first been aged for 3 hours in the presence of ammonia. The catalyst thus obtained is aged for 24 hours in a humid atmosphere (relative humidity 99%), then dried for 1 hour at 120° C., calcined for 2 hours at 500° C., then again 2 hours during which chlorine is injected in order to obtain 1 wt. % chlorine in the final catalyst. The support is then reduced under hydrogen for 2 hours at 520° C.

The final catalyst contains 0.29 wt. % platinum and 0.3 wt. % tin. The platinum has an average distribution coefficient of 0.92.

Example 10 (in Accordance)

Preparation of Catalyst J

The support is a γ alumina of specific surface area 215 $m^2$ per gram containing 0.3 wt. % tin, 100 g support are contacted with 65 $cm^3$ of an aqueous solution of hexachloroplatinic acid comprising 0.30 g platinum and 3 molar equivalents of 2,2'-bipyridyl with respect to the platinum. This solution has first been aged for 3 hours in the presence of ammonia. The catalyst thus obtained is aged for 24 hours in a humid atmosphere (relative humidity 99%), then dried for 1 hour at 120° C., calcined for 2 hours at 500° C., then again 2 hours during which chlorine is injected in order to obtain 1 wt. % chlorine in the final catalyst. The support is then reduced under hydrogen for 2 hours at 520° C.

The final catalyst contains 0.29 wt. % platinum and 0.3 wt. % tin. The platinum has an average distribution coefficient of 0.85.

Example 11 (in Accordance)

Preparation of Catalyst K

The support is a γ alumina of specific surface area 215 $m^2$ per gram containing 0.3 wt. % tin. 100 g support are contacted with 65 $cm^3$ of an aqueous solution of hexachloroplatinic acid comprising 0.30 g platinum and 1 molar equivalent of ethylene diamine tetra-acetic acid (EDTA) with respect to the platinum. This solution has first been aged for 3 hours in the presence of ammonia. Just before impregnation, 0.95 wt. % chlorine with respect to the mass of dry support is added to the impregnation solution in form of hydrochloric acid. The catalyst thus obtained is aged for 24 hours in a humid atmosphere (relative humidity 99%), then dried for 1 hour at 120° C., calcined for 2 hours at 500° C. and reduced under hydrogen for 2 hours at 520° C.

The final catalyst contains 0.29 wt. % platinum, 0.3 wt. % tin and 1.03 wt. % chlorine. The platinum has an average distribution coefficient of 0.94.

Example 12 (in Accordance)

Preparation of Catalyst L

The support is a γ alumina of specific surface area 215 $m^2$ per gram containing 0.3 wt. % tin. 100 g support are contacted with 65 $cm^3$ of an aqueous solution of hexachloroplatinic acid comprising 0.30 g platinum and 3 molar equivalents of ethylene diamine with respect to the platinum. This solution has first been aged for 3 hours in the presence of ammonia. $NH_4Cl$ is added to the preparation in order to obtain about 1 wt. % chlorine in the final catalyst. The catalyst thus obtained is aged for 24 hours in a humid atmosphere (relative humidity 99%), then dried for 1 hour at 120° C., calcined for 2 hours at 500° C. and reduced under hydrogen for 2 hours at 520° C.

The final catalyst contains 0.29 wt. % platinum, 0.3 wt. % tin and 1.05 wt. % chlorine. The platinum has an average distribution coefficient of 0.97.

Example 13 (in Accordance)

Preparation of Catalyst M

The support is a γ alumina of specific surface area 215 $m^2$ per gram containing 0.3 wt. % tin. 100 g support are contacted with 65 $cm^3$ of an aqueous solution of hexachloroplatinic acid comprising 0.30 g platinum and 3 molar equivalents of ethylene diamine with respect to the platinum. This solution has first been aged for 3 hours in the presence of ammonia. Hydrochloric acid is added to the preparation in order to obtain 1 wt. % chlorine in the final catalyst. The catalyst thus obtained is aged for 24 hours in a humid atmosphere (relative humidity 99%), then dried for 1 hour at 120° C., calcined for 2 hours at 500° C. and reduced under hydrogen for 2 hours at 520° C.

The final catalyst contains 0.29 wt. % platinum and 0.3 wt. % tin. The platinum has an average distribution coefficient of 0.97.

Example 14 (in Accordance)

Preparation of Catalyst N

The support is a γ alumina of specific surface area 215 $m^2$ per gram containing 0.3 wt. % tin. 100 g support are contacted with 65 $cm^3$ of an aqueous solution of hexachloroplatinic acid comprising 0.30 g platinum, 1 molar equivalent of DTPA with respect to the platinum and 4 g sucralose (1,6-dichloro-1,6-didesoxy-β-D-fructofuranosyl 4-chloro-4-desoxy-α-D-galactose). This solution has first been aged for 3 hours in the presence of ammonia. The catalyst thus obtained is aged for 24 hours in a humid atmosphere (relative humidity 99%), then dried for 1 hour at 120° C., calcined for 2 hours at 500° C. and reduced under hydrogen for 2 hours at 520° C.

The final catalyst contains 0.29 wt. % platinum, 0.3 wt. % tin and 0.98 wt. % chlorine. The platinum has an average distribution coefficient of 0.94.

Example 15 (in Accordance)

Preparation of Catalyst O

The support is a γ alumina of specific surface area 215 $m^2$ per gram containing 0.3 wt. % tin. 100 g support are contacted with 65 $cm^3$ of an aqueous solution of hexachloroplatinic acid comprising 0.30 g platinum and 1 molar equivalent of cyclen (1,4,7,10-tetra-azacyclododecane) with respect to the platinum. This solution has first been aged for 3 hours in the presence of ammonia. The catalyst thus obtained is aged for 24 hours in a humid atmosphere (relative humidity 99%), then dried for 1 hour at 120° C., calcined for 2 hours at 500° C., then again 2 hours during which chlorine is injected in order to obtain 1 wt. % chlorine in the final catalyst. The support is then reduced under hydrogen for 2 hours at 520° C.

The final catalyst contains 0.29 wt. % platinum and 0.3 wt. % tin. The platinum has an average distribution coefficient of 0.98.

Example 16 (in Accordance)

Preparation of Catalyst P

The support is a γ alumina of specific surface area 215 $m^2$ per gram containing 0.3 wt. % tin. 100 g support are contacted with 65 $cm^3$ of an aqueous solution of hexachloroplatinic acid comprising 0.30 g platinum and 3 molar equivalents of ethylene diamine with respect to the platinum. This solution has first been aged for 3 hours in the presence of ammonia. 2.8 g trichloroacetic acid are added to the preparation. The catalyst thus obtained is aged for 24 hours in a humid atmosphere (relative humidity 99%), then dried for 1 hour at 120° C., calcined for 2 hours at 500° C., then again 2 hours during which chlorine is injected in order to obtain 1 wt. % chlorine in the final catalyst. The support is then reduced under hydrogen for 2 hours at 520° C.

The final catalyst contains 0.29 wt. % platinum, 0.3 wt. % tin and 1.05 wt. % chlorine. The platinum has an average distribution coefficient of 1.

Example 17 (not in Accordance)

Preparation of Catalyst Q

The support is a γ alumina of specific surface area 215 $m^2$ per gram. 100 g support are contacted with 500 $cm^3$ of an aqueous solution of hydrochloric acid and of hexachloroplatinic acid comprising 0.30 g platinum. The amount of hydrochloric acid is adjusted so as to have a chlorine content close to 1 wt. % in the final catalyst. The impregnation solution is then withdrawn.

300 $cm^3$ of an aqueous solution comprising 0.46 g rhenium introduced in form of ammonium perrhenate are contacted with the support comprising platinum obtained at the end of the previous stage for 3 hours.

The catalyst thus obtained is dried for 1 hour at 120° C., calcined for 2 hours at 500° C. and reduced under hydrogen for 2 hours at 520° C.

The catalyst is then sulfurized with a hydrogen/$H_2S$ mixture (2660 ppm by weight of $H_2S$) for 7 minutes at 500° C. (flow rate: 220 $cm^3$/min under NTP conditions).

The final catalyst contains 0.29 wt. % platinum and 0.3 wt. % rhenium. The platinum and the rhenium have average distribution coefficients ranging between 0.91 and 0.99.

Example 18 (in Accordance)

Preparation of Catalyst R

The support is a γ alumina of specific surface area 215 $m^2$ per gram. 100 g support are contacted with 65 $cm^3$ of an aqueous solution of hexachloroplatinic acid comprising 0.30 g platinum, 0.32 g rhenium introduced in form of ammonium perrhenate and 1 molar equivalent of DTPA with respect to the platinum. This solution has first been aged for 3 hours in the presence of ammonia.

The catalyst thus obtained is aged for 24 hours in a humid atmosphere (relative humidity 99%), then dried for 1 hour at 120° C., calcined for 2 hours at 500° C., then again 2 hours during which chlorine is injected in order to obtain 1 wt. % chlorine in the final catalyst. The support is thereafter reduced under hydrogen for 2 hours at 520° C. The catalyst is then sulfurized with a hydrogen/$H_2S$ mixture (2660 ppm by weight of $H_2S$) for 7 minutes at 500° C. (flow rate: 220 $cm^3$/min under NTP conditions).

The final catalyst contains 0.29 wt. % platinum and 0.3 wt. % rhenium. The platinum and the rhenium have average distribution coefficients ranging between 0.91 and 0.99, and impregnation rates above 90%.

Example 19 (in Accordance)

Preparation of Catalyst S

The support is a γ alumina of specific surface area 215 $m^2$ per gram. 100 g support are contacted with 65 $cm^3$ of an aqueous solution of hexachloroplatinic acid comprising 0.30 g platinum, 0.32 g rhenium introduced in form of ammonium perrhenate and 4 molar equivalents of ethylene diamine with respect to the platinum. This solution has first been aged for 3 hours in the presence of ammonia.

The catalyst thus obtained is aged for 24 hours in a humid atmosphere (relative humidity 99%), then dried for 1 hour at 120° C., calcined for 2 hours at 500° C., then again 2 hours during which chlorine is injected in order to obtain 1 wt. % chlorine in the final catalyst. The support is thereafter reduced under hydrogen for 2 hours at 520° C. The catalyst is then sulfurized with a hydrogen/$H_2S$ mixture (2660 ppm by weight of $H_2S$) for 7 minutes at 500° C. (flow rate: 220 $cm^3$/min under NTP conditions).

The final catalyst contains 0.29 wt. % platinum and 0.3 wt. % rhenium. The platinum and the rhenium have average distribution coefficients ranging between 0.97 and 0.99, and impregnation rates above 90%.

Example 20 (in Accordance)

Preparation of Catalyst T

The support is a γ alumina of specific surface area 215 $m^2$ per gram. 100 g support are contacted with 65 $cm^3$ of an aqueous solution of hexachloroplatinic acid comprising 0.30 g platinum, 0.32 g rhenium introduced in form of ammonium perrhenate and 3 molar equivalents of bipyridine with respect to the platinum. This solution has first been aged for 3 hours in the presence of ammonia.

The catalyst thus obtained is aged for 24 hours in a humid atmosphere (relative humidity 99%), then dried for 1 hour at 120° C., calcined for 2 hours at 500° C., then again 2 hours during which chlorine is injected in order to obtain 1 wt. % chlorine in the final catalyst. The support is thereafter reduced under hydrogen for 2 hours at 520° C. The catalyst is then sulfurized with a hydrogen/$H_2S$ mixture (2660 ppm by weight of $H_2S$) for 7 minutes at 500° C. (flow rate: 220 $cm^3$/min under NTP conditions).

The final catalyst contains 0.29 wt. % platinum and 0.3 wt. % rhenium. The platinum and the rhenium have average distribution coefficients ranging between 0.90 and 0.99, and impregnation rates above 90%.

Example 21 (in Accordance)

Preparation of Catalyst U

The support is a γ alumina of specific surface area 215 $m^2$ per gram. 100 g support are contacted with 65 $cm^3$ of an aqueous solution of hexachloroplatinic acid comprising 0.30 g platinum, 0.32 g rhenium introduced in form of ammonium perrhenate and 1 molar equivalent of cyclen with respect to the platinum. This solution has first been aged for 3 hours in the presence of ammonia.

The catalyst thus obtained is aged for 24 hours in a humid atmosphere (relative humidity 99%), then dried for 1 hour at 120° C., calcined for 2 hours at 500° C., then again 2 hours during which chlorine is injected in order to obtain 1 wt. % chlorine in the final catalyst. The support is thereafter reduced under hydrogen for 2 hours at 520° C. The catalyst is then sulfurized with a hydrogen/$H_2S$ mixture (2660 ppm by weight of $H_2S$) for 7 minutes at 500° C. (flow rate: 220 $cm^3$/min under NTP conditions).

The final catalyst contains 0.29 wt. % platinum and 0.3 wt. % rhenium. The platinum and the rhenium have average distribution coefficients ranging between 0.98 and 0.99, and impregnation rates above 90%.

Example 22 (in Accordance)

Preparation of Catalyst V

The support is a γ alumina of specific surface area 215 $m^2$ per gram. 100 g support are contacted with 65 $cm^3$ of an aqueous solution of hexachloroplatinic acid comprising 0.30 g platinum, 0.32 g rhenium introduced in form of ammonium perrhenate and 1 molar equivalent of EDTA with respect to the platinum. This solution has first been aged for 3 hours in the presence of ammonia.

The catalyst thus obtained is aged for 24 hours in a humid atmosphere (relative humidity 99%), then dried for 1 hour at 120° C., calcined for 2 hours at 500° C., then again 2 hours during which chlorine is injected in order to obtain 1 wt. % chlorine in the final catalyst. The support is thereafter reduced under hydrogen for 2 hours at 520° C. The catalyst is then sulfurized with a hydrogen/$H_2S$ mixture (2660 ppm by weight of $H_2S$) for 7 minutes at 500° C. (flow rate: 220 $cm^3$/min under NTP conditions).

The final catalyst contains 0.29 wt. % platinum and 0.3 wt. % rhenium. The platinum and the rhenium have average distribution coefficients ranging between 0.91 and 0.99, and impregnation rates above 90%.

Example 23 (not in Accordance)

Preparation of Catalyst W

The support is a γ alumina of specific surface area 215 $m^2$ per gram. 100 g support are contacted with 65 $cm^3$ of an aqueous solution of hexachloroplatinic acid comprising 0.30 g platinum, 0.32 g rhenium introduced in form of ammonium perrhenate and 1 molar equivalent of EDTA with respect to the platinum. This solution has not been aged in the presence of ammonia.

The catalyst thus obtained is aged for 24 hours in a humid atmosphere (relative humidity 99%), then dried for 1 hour at 120° C., calcined for 2 hours at 500° C., then again 2 hours during which chlorine is injected in order to obtain 1 wt. % chlorine in the final catalyst. The support is thereafter reduced under hydrogen for 2 hours at 520° C. The catalyst is then sulfurized with a hydrogen/$H_2S$ mixture (2660 ppm by weight of $H_2S$) for 7 minutes at 500° C. (flow rate: 220 $cm^3$/min under NTP conditions).

The final catalyst contains 0.29 wt. % platinum and 0.3 wt. % rhenium. The platinum and the rhenium have an average distribution coefficient of 0.75 and an impregnation rate above 90%.

Example 24

Catalytic Tests

The catalysts for which platinum has an average distribution coefficient above 0.8 were tested for the conversion of a hydrocarbon feed of naphtha type resulting from petroleum distillation. It is in fact known to the person skilled in the art that the metals in reforming catalysts have to be well distributed. The feed characteristics are as follows:

| | | |
|---|---|---|
| Density at 15° C. | 0.759 | kg/dm |
| Average molecular weight | 119 | g |
| Paraffins/naphthenes/aromatics | 53/31/16 | wt. %. |

This conversion is carried out in a pilot test plant with a traversed bed in the presence of hydrogen. Prior to feed injection, the catalysts are activated at high temperature under hydrogen for 2 hours. The test is conducted using the following operating conditions for the Pt/Re catalysts:

Total pressure: 1.5 MPa
Feed flow rate: 2 kg per kg of catalyst per hour
Research octane number: 98
Molar ratio of recycled hydrogen to hydrocarbon feed: 2.5.

The test is carried out using the following operating conditions for the Pt/Sn catalysts:

Total pressure: 0.35 MPa
Feed flow rate: 2.5 kg per kg of catalyst per hour
Research octane number: 104
Molar ratio of recycled hydrogen to hydrocarbon feed: 4.

The performances obtained after 40 hours (200 hours for Pt/Re catalysts) operation are given in Table 1 (Table 2 for Pt/Re catalysts), i.e. the temperature required to reach the desired research octane number, representative of the catalyst activity, and the weight yields in $C_5^+$ (hydrocarbons containing at least 5 carbon atoms) and $C_4^-$ (hydrocarbons containing from 1 to 4 carbon atoms) reformate, representative of the catalyst selectivity.

TABLE 1

Catalytic performances of catalysts of formulation Pt/Sn

| Catalyst | Temperature after 40 h (° C.) | $C_5^+$ yield (wt. %) | $C_4^-$ yield (wt. %) |
|---|---|---|---|
| A (not in accordance) | 496 | 91.1 | 5.6 |
| E (not in accordance) | 500 | 90.3 | 6.5 |
| F | 496 | 91.2 | 5.5 |
| G (not in accordance) | 497 | 90.2 | 6.7 |
| I | 496 | 90.9 | 5.8 |
| J | 500 | 90.8 | 6.5 |
| K | 496 | 91.2 | 5.5 |
| L | 496 | 91.3 | 5.6 |
| M | 494 | 91.2 | 5.5 |
| N | 493 | 90.9 | 5.8 |
| O | 494 | 91.3 | 5.4 |
| P | 493 | 91.5 | 5.1 |

TABLE 2

Catalytic performances of catalysts of formulation Pt/Re

| Sample | Temperature (° C.) | $C_5^+$ yield (wt. %) | $C_4^-$ yield (wt. %) |
|---|---|---|---|
| Q (not in accordance) | 498 | 88.7 | 9.6 |
| R | 496 | 88.4 | 9.8 |
| S | 496 | 88.8 | 9.5 |
| T | 499 | 88.5 | 9.8 |
| U | 498 | 88.7 | 9.6 |
| V | 495 | 88.8 | 9,5 |

The catalytic performances are equivalent for the dry impregnation preparation method according to the invention and for the excess impregnation preparation method (catalysts A and Q). Thus, changing for dry impregnation is, on the one hand, more economical and, on the other hand, it does not alter the catalytic performances.

Comparison of the various catalysts prepared by dry impregnation shows that the use of ammonia alone, without a complexing agent, followed by the aging stage in a humid medium (catalyst E), the use of ammonia with a complexing agent but without the aging stage in a humid medium (catalyst G) and the use of a complexing agent alone, without ammonia, followed by the aging stage in a humid medium (catalysts H and W) does not allow to obtain interesting performances in combination with good distributions (average distribution coefficient above 0.8).

On the other hand, the use of ammonia and of an aging stage in a humid medium in combination with the complexing agents according to the invention allows to obtain well distributed catalysts and more interesting performances (catalysts F, I, J, K, L, M, N, O, P for tin and R, S, T, U and V for rhenium).

Besides, the use of citric acid in the presence of ammonia, followed by the aging stage in a humid atmosphere, does not allow to obtain a catalyst whose metals are well distributed (catalyst D).

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The entire disclosures of all applications, patents and publications, cited herein and of corresponding French application No. 09/02260, filed May 7, 2009, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A method of preparing a reforming catalyst comprising a group VIII metal, a halogen, at least one group VIIB or group IVA metal, and a refractory oxide support, said method comprising:

a) incorporating of the group VIII and VIIB metals by preparing a dry impregnation aqueous solution, comprising either a group VIII metal or a group VIII metal and a group VIIB metal, ammonia either in solution or in gas form, and at least one complexing agent that is EDTA or derivatives thereof, at least bidentate primary amine complexes, secondary amine complexes or pyridine ring derivatives, b) aging said dry impregnation aqueous solution obtained at the end of (a), over a period of time ranging between 5 minutes and 24 hours, at a temperature ranging between 15° C. and 100° C., c) dry impregnating of the support by the aged dry impregnation aqueous solution obtained at the end of b), d) maturing the impregnated support obtained at the end of c), said maturation being carried out in a humid medium over a period of time ranging between 30 minutes and 48 hours, e) drying the impregnated support obtained at the end of d), at a drying temperature between 80° C. and 200° C., over a period of time between 5 minutes and 5 days, f), calcining at a calcination temperature between 300° C. and 850° C. and a calcination time between 5 minutes and 20 hours, incorporating the group IVA metal, if present, during or subsequent to preparation of the support.

2. A catalyst preparation method as claimed in claim 1, wherein the support also comprises at least one dopant that is scandium, yttrium, germanium, indium, antimony, lead, thallium, gallium, bismuth, phosphorus, arsenic, lanthanides or actinides.

3. A catalyst preparation method as claimed in claim 1 comprising, after (f), an oxychlorination (g), at an oxychlorination temperature ranging between 300° C. and 850° C., and an oxychlorination time between 5 minutes and 20 hours.

4. A catalyst preparation method as claimed in claim 3 comprising, after (f) or (g), h) catalyst reduction under hydrogen at a temperature between 300° C. and 850° C. over a period of time between 5 minutes and 20 hours.

5. A catalyst preparation method as claimed in claim 1 comprising producing a final proportion of group VIII metal in the catalyst of between 0.01 and 5 wt. %.

6. A catalyst preparation method as claimed in claim 1 comprising producing a final proportion of group VIIB metal in the catalyst of between 0.01 and 5 wt. %.

7. A catalyst preparation method as claimed in claim 1 comprising producing a final proportion of group IVA metal in the catalyst of between 0.01 and 7 wt. %.

8. A catalyst preparation method as claimed in claim 1, wherein the halogen is fluorine, chlorine, bromine and iodine, or wherein the proportion of halogen in the catalyst ranges between 0.1 and 10 wt. %.

9. A catalyst preparation method as claimed in claim 8, wherein the halogen is chlorine.

10. A catalyst preparation method as claimed in claim 9, wherein the final proportion of chlorine in the catalyst is between 0.5 and 2 wt. %.

11. A catalyst preparation method as claimed in claim 9, wherein the dry impregnation aqueous solution also comprises a chlorine precursor.

12. A catalyst preparation method as claimed in claim 11, wherein the chlorine precursor is selected from HCl, $NH_4Cl$ and organochlorinated compounds.

13. A catalyst preparation method according to claim 12, wherein the chlorine precursor is trichloroacetic acid.

14. A catalyst preparation method as claimed in claim 1, wherein the dry impregnation aqueous solution comprises a complexing agent that is DTPA or derivatives thereof, ethylene diamine, cyclen or 2,2'-bipyridine.

15. A catalyst preparation method according to claim 1 wherein the maturation is conducted for at least 1 hour.

16. A catalyst preparation method according to claim 1 wherein the complexing agent of claim 1 is EDTA.

* * * * *